June 11, 1963 H. W. SAMO 3,092,931
DOLL EYE
Filed Nov. 15, 1960 4 Sheets-Sheet 1

INVENTOR.
HARVEY W. SAMO

*James & Franklin*

ATTORNEYS

June 11, 1963 H. W. SAMO 3,092,931
DOLL EYE

Filed Nov. 15, 1960 4 Sheets-Sheet 2

INVENTOR.
HARVEY W. SAMO

BY
*James R. Franklin*

ATTORNEYS

June 11, 1963  H. W. SAMO  3,092,931
DOLL EYE
Filed Nov. 15, 1960  4 Sheets-Sheet 3
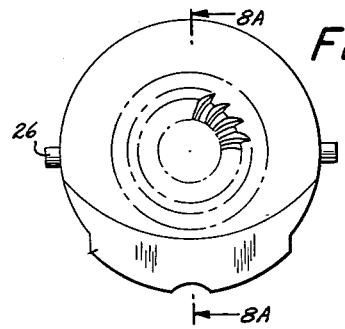
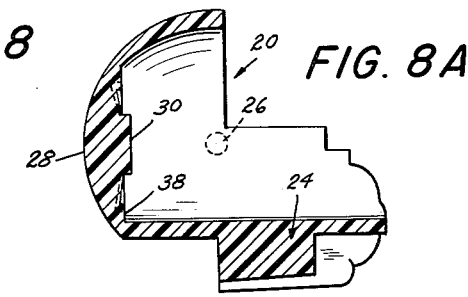
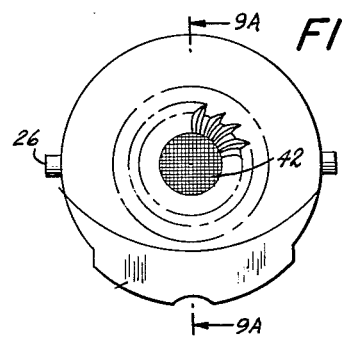
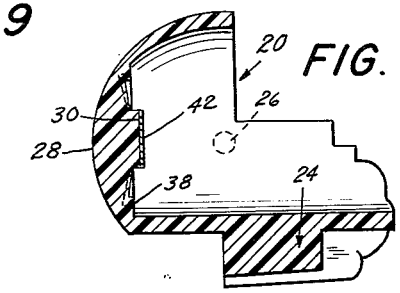
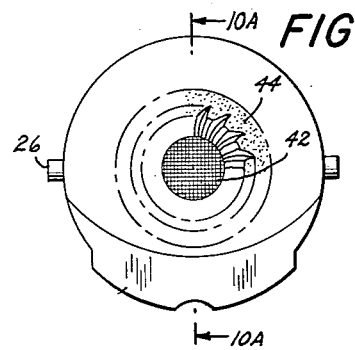
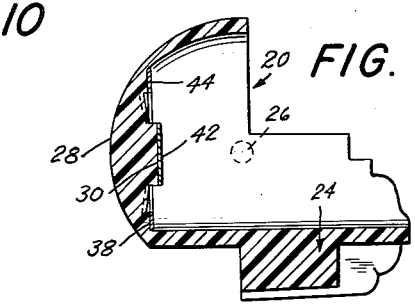
INVENTOR.
HARVEY W. SAMO
BY
*James K. Franklin*
ATTORNEYS June 11, 1963   H. W. SAMO   3,092,931
DOLL EYE Filed Nov. 15, 1960   4 Sheets-Sheet 4

INVENTOR.
HARVEY W. SAMO
BY
ATTORNEYS

United States Patent Office 3,092,931
Patented June 11, 1963

3,092,931
DOLL EYE
Harvey W. Samo, Bayonne, N.J., assignor to Margon Corporation, Newark, N.J., a corporation of New Jersey
Filed Nov. 15, 1960, Ser. No. 69,410
5 Claims. (Cl. 46—169)

This invention relates to doll eyes and to a method of making the same.

In doll eyes as currently produced, the eye members are made as a single body of transparent material molded to provide a front convex surface simulating the cornea of the eye and a rear surface configuration providing for the pupil portion and the iris portion of the eye. The pupil portion is made to comprise a central area, and the iris portion is made to comprise an area surrounding the pupil area formed with radially arranged serrations encircled by a generally planar (i.e. non-serrated) rim. To simulate the human eye, the pupil area has to appear black and the iris area has to appear the color of the eye being simulated, i.e. brown for a brown eye and blue for a blue eye, etc.; and to attain the desired effect, the iris area near the pupil area is colored relatively light in the selected iris color while the iris area at the rim is colored relatively dark, the iris being thereby given a desired color gradation with an increase of color tone or value from the pupil to the iris periphery.

The imparting of the selected color and color tone gradation to the iris area has been accomplished in a number of ways. For producing the most life-like eye simulation, the practice disclosed in the patent to Marcus No. 2,254,232 of September 2, 1941, has been followed to this day. The iris area is colored by applying a color thereto extraneously, the coloring material being applied predominantly around the iris rim and being carried inwardly to a lesser degree over the serrated area. This is done either by directly imprinting as by inking the coloring material on the iris area with the desired color in gradation or by similarly imprinting a color disc or cup and then mounting the same over the iris area. The imprinted disc or cup type eye, even though the eye member comprises two parts, has been preferred over the direct imprinting type eye because of the difficulty in the latter of controlling the color printing, slight differences in ink viscosity, transfer, and punch pressure having a material effect in the appearance of the iris; and while the preferred imprinted cup type method does not possess these disadvantages, thus making it possible to better maintain a well controlled production, the cup type method, by adding a part and adding manufacturing and assembly steps, increases the manufacturing cost.

To eliminate the trouble and manufacturing cost involved in extraneously applying color and in gradation or tone change to the iris area, as well as to the pupil area, I invented the doll eye of Patent No. 2,657,500 of November 3, 1953, wherein all of the necessary colors, i.e. blue in gradation for a blue eye, brown in gradation for a brown eye, etc., as well as black for the pupil were created without any extraneous coloring by constructing the pupil and iris areas in an eye member, made of a transparent body tinted with the selected iris color, with reflecting and non-reflecting areas in such a way that when the eye member is associated with a black background, the iris area, by the reflection (and non-reflection) principle, appears in the selected tinted color and color tone or gradation and the pupil appears black. Eyes embodying this invention are made with great economy and are being manufactured on an extensive scale. However, it cannot be said that such so-called "reflection" eyes are a faithful reproduction of the human eye; and it is recognized that the appearance of these reflection eyes is inferior to the more expensive imprinted type eyes above described.

The prime object of my present invention centers about the making of a doll eye which possesses the more faithful eye appearance of imprinted type eyes, and which while also made with color imprinting steps, are not subject to the objections of the direct imprinted type eye or the imprinted cup or disc type eye, in that the lack of a well controlled production to which the former is incident is solved and in that the increased cost of manufacture to which the latter is incident is avoided.

In accordance with the principles of my present invention, the eye member is made out of a single body of transparent material contoured to provide at its rear configuration a pupil portion and an iris portion, the iris portion being made to comprise a grooved area of radially arranged serrations surrounding the area of the pupil portion and a generally planar, i.e. non-grooved peripheral area surrounding the grooved area, the grooved area at its juncture with the peripheral area being depressed throughout its circumference below the peripheral area, the peripheral area being thereby raised or elevated throughout its circumference with reference to the grooved area. Preferably also the grooved area at and about the pupil portion is depressed below the pupil area. With this structure, the iris rim may be imprinted with the desired dark hue or tone of the selected iris color without the coloring material being carried inwardly into and over the serrations of the grooved area. Because of the raised or elevated position of the iris rim or peripheral area, differences in printing ink viscosity, transfer, punch pressure, etc., will not materially affect the appearance of the iris and the method thus lends itself to easy maintenance and well controlled production. The grooved area in turn is reserved for the light color tone or hue by utilizing the reflection effect therefor, and for this purpose the radial serrations are given the desired angular formation (in cross-section) and the material of transparent plastic used is tinted for the desired color, i.e. blue for a blue eye, brown for brown eye, etc., the material being used untinted for a gray eye. The pupil area may be likewise imprinted, with a black tint, however, without liability of ink spreading to the grooved part of the iris. I thereby produce an eye member whose appearance, and the manufacturing control of which, is as good as the imprinted cup type eye but consists only of one part, designed thus to permit utmost economy in manufacture.

To the accomplishment of the foregoing objects and such other objects as may hereinafter appear, the present invention relates to the doll eye and method of making the same as sought to be defined in the appended claims taken together with the following description and the accompanying drawings in which:

Figure 4:
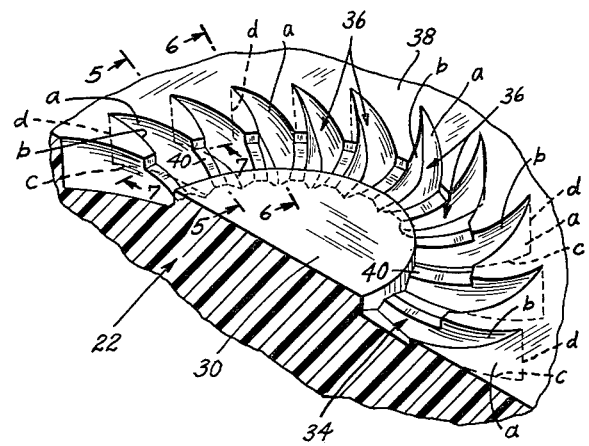
FIG. 4 is a perspective view shown to an enlarged scale and in median cross-section of the pupil and iris portions of the eye.
Figure 5:
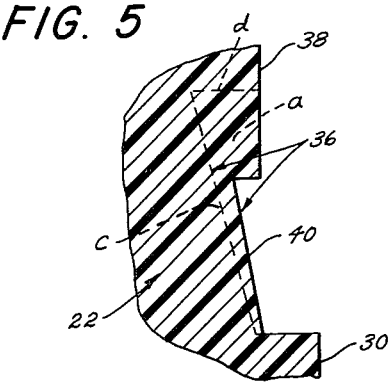
FIG. 5 is a view of FIG. 4 shown on a still further enlarged scale and taken in cross-section in the plane of the line 5—5 of FIG. 4.
Figure 6:
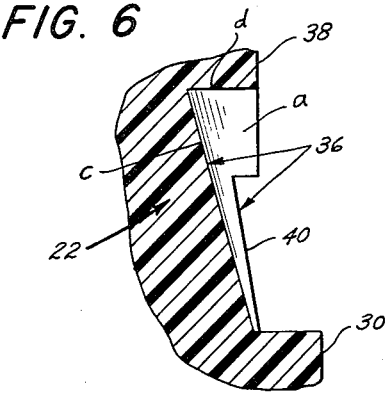
FIG. 6 is a view similar to FIG. 5 taken, however, in cross-section in the plane of the line 6—6 of FIG. 4.
Figure 7:
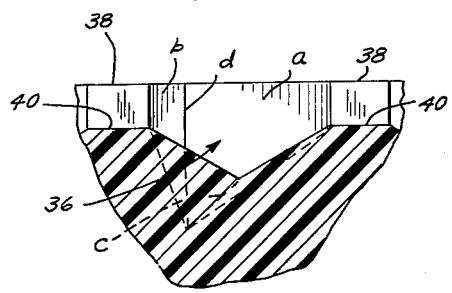

FIG. 7 is a view shown to the scale of FIGS. 5 and 6 and taken in cross-section in the plane of the line 7—7 of FIG. 4; and FIGS. 8 to 10A are views depicting the method of completing the doll eye, of which FIG. 8 is a front elevational view of the eye; and FIG. 8A is a view thereof taken in cross-section in the plane of the line 8a—8a of FIG. 8, these views showing the doll eye before any color printing or applying step;

FIG. 9 is a front elevational view of the eye; and

Figure 11:
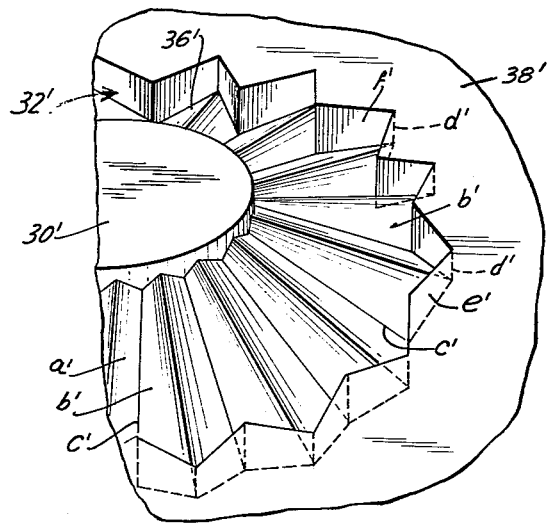
Figure 12:
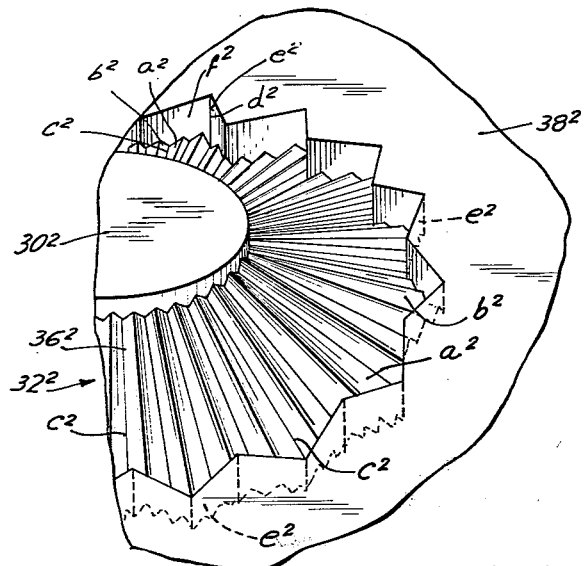

FIG. 9A is a view thereof taken in cross-section in the plane of the line 9a—9a of FIG. 9 depicting the eye with a coat of coloring material applied to the pupil; and FIG. 10 is a front elevational view of the eye; and FIG. 10A is a view taken in cross-section thereof in the plane of the line 10a—10a of FIG. 10 depicting the eye with a coat of coloring material applied to the peripheral area or rim of the iris, and FIGS. 11 and 12 are views of modifications.

Figure 1:
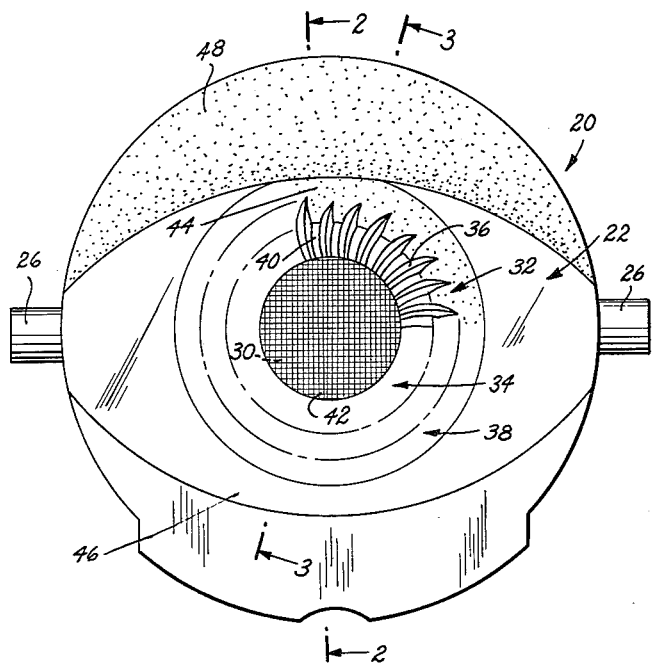
FIG. 1 is a vertical front elevational view of the doll eye in finished form.
Figure 3:
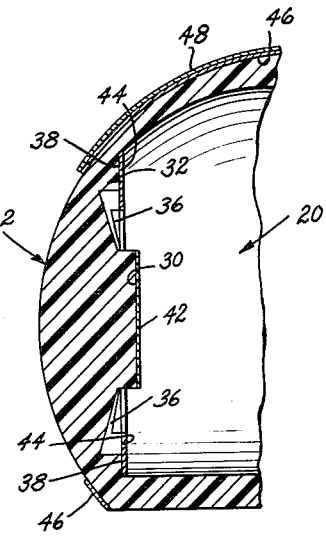
FIG. 3 is a similar cross-sectional view taken, however, in cross-section in the plane of the line 3—3 of FIG. 1.
Figure 2:
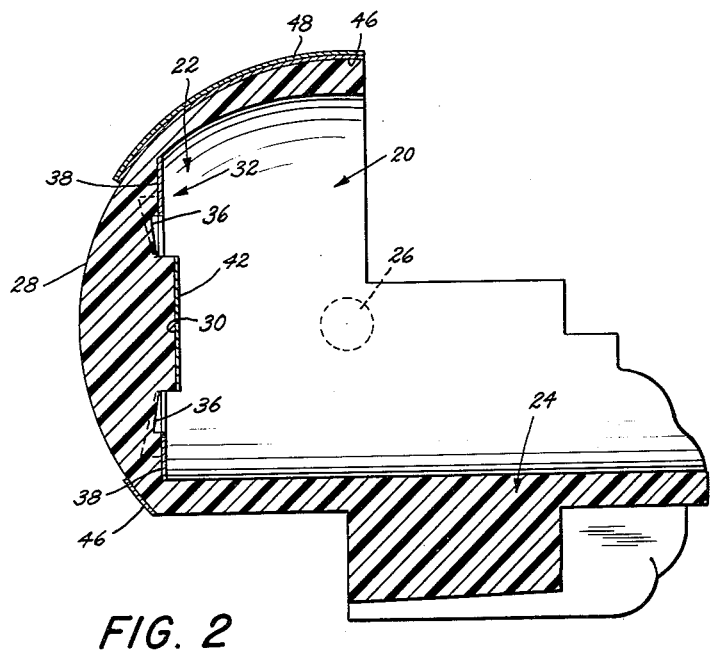
FIG. 2 is a view thereof taken in cross-section in the plane of the line 2—2 of FIG. 1.

Referring now more in detail to the drawings and having reference first to FIGS. 1 to 3 thereof, the doll eye 20 of the invention comprises an eye member 22 made of a transparent plastic material molded preferably integrally with a weight portion 24 extending rearwardly at the bottom thereof, the said eye being also integrally formed with trunnions 26, 26 for pivotally mounting the eye in a casing or housing, which in turn is adapted to be received in a socket of a doll head as disclosed in the patent to Prupis No. 2,828,581 of April 1, 1958.

The eye member 22 is molded to shape to provide a front convex surface 28 simulating the cornea of the eye and a rear surface configuration providing for a pupil portion 30 and an iris portion 32. The pupil portion 30 is made to comprise a central area, and the iris portion 32 is made to comprise an area 34 surrounding the pupil area formed with radially arranged serrations 36 and circled by a generally planar (i.e. non-serrated relatively flat) rim area 38.

In doll eyes of this general description and as currently produced, the pupil area 30 has to appear black and the iris area 34 composed of a grooved area comprising radial serrations 36 and the non-serrated or planar rim 38 has to appear the color of the eye being simulated, i.e. brown for a brown eye, blue for a blue eye, gray for a gray eye, etc., and to attain the desired iris coloring the iris area near the pupil, namely the area 34, is colored relatively light in the selected iris color while the iris area at the rim, namely the area 38, is colored relatively heavy or dark, the iris being thereby given a desired color gradation with an increase of color tone or hue in the direction from the pupil to the iris periphery.

To accomplish the purposes of the present invention, the grooved area comprising the serrations 36 at the juncture of this grooved area with the peripheral or rim area 38, is depressed throughout the circumference of the grooved area below the peripheral area. Preferably also the grooved area 36 is depressed below the pupil area 30, the pupil area being also preferably formed as a cylindrical stud. This structure is best depicted in FIGS. 4 to 7 of the drawings. The radial serrations 36 (which may be slightly curved in a radial direction as best indicated in FIG. 1) are formed to provide the sides $a$ and $b$ forming a dihedral angle, the apex of the angle being defined by the line $c$, the drop or depression of the serrations at their juncture with the rim area 38 of the iris being represented by the line $d$ (as best shown in FIGS. 4 and 7). The serrations may be spaced from one another by relatively flat areas 40, 40 which are also depressed with reference to the rim area 38 and also preferably with reference to the pupil area 30. The essence of this structure is thus that the grooved area comprising the serrations 36 at the juncture with the peripheral area 38 (and this also includes the groove separating parts 40) is depressed at all of the meeting points, i.e. throughout its circumference below the peripheral area, the peripheral area being thereby raised or elevated throughout its circumference in turn with relation to the grooved area. And, as stated it is also preferred that the grooved area 36 at and about the pupil portion is depresed below the pupil area.

With this recited structure, the iris rim or peripheral area 38 may be imprinted with the desired dark hue or tone of the selected iris color without the coloring material being carried inwardly into and over the serrations of the grooved area, and also in the preferred structure a color coating may be applied to the pupil area without the coloring material being carried inwardly into and over the serrations of the grooved area, as will be further described hereinafter.

The forming of the serrations producing the angularly related walls or surfaces $a$ and $b$ as described, results in a grooved iris area which defines means for reflecting the tint of the transparent material of which the eye member is molded, imparting this tint to the grooved area of the iris when the eye is associated with a black background as provided by the housing or casing in which the eye is pivotally mounted. As a result a color in a light hue is given to the grooved section of the iris, the color being blue for a blue eye, light brown for a brown eye, etc. The angular serrations 36 also define the iris lines; and the star shape imparted to the inner periphery of the rim area 38 (best shown in FIGS. 1 and 4) imparts a star-like effect to the iris, which is designed in this described form of the invention to conform to and blend with the grooved iris lines.

The manner of applying the extraneous coloring to the iris rim and also to the pupil is depicted in FIGS. 8 to 10A of the drawings. FIGS. 8 and 8A show the eye structure in its described molded form before the application thereto of any extraneous coloring material. FIGS. 9 and 9A show the next step of the process of applying a black coloring material 42 to the pupil area 30. This step of the process is optional since the effect of producing a black pupil may also be obtained by leaving the pupil area 30 clear of any applied coloring, the black pupil effect being obtainable by associating the doll eye with a black background. However, for the best effects it is desirable to apply a coloring material to the pupil area as indicated and this may be done as by a dipping or other step without any of the coloring material bleeding into the grooved area. In the next step of the process as depicted in FIGS. 10 and 10A, a coat 44 of coloring material, as for example a blue or brown, or other colored ink, is printed onto the rim or peripheral area 38 of the iris. This is also therefore accomplished without liability of any of the coloring material bleeding into any part of the grooved area, thereby the outer dark iris ring is obtained by application of the proper color to the inside of the eye member. With the devised structure of the eye member the application of this color may be repeated consistently whatever shade and shape is desired. Thus the raised rim area 38 may have the desired irregular shape, permitting the star-like effect of the grooved area, and the color may be imprinted thereon with uniformity and with surface contour precision. Thus, the devised construction of the eye member lends itself to automatic operation of printing where a cycle of printing consists in automatically inking a rubber printing punch, descending the same into the eye shell or member, transferring ink to the rim area of the iris and ascending again to the indexing of the next eye member to be printed. This operation lends itself to easy maintenance and well controlled production since slight differences in ink viscosity, transfer, punch pressure, etc., will not materially affect the appearance of the iris of different eyes in production.

To finish the doll eye the convex surface 22 is then sprayed (with suitable masking) with a white spray to produce an eyeball simulating color coat 46 and thereafter the top sector is sprayed to produce a flesh color coat 48 to simulate the eyelid.

In FIG. 11 of the drawings, I show a modification of the rear surface configuration of the eye member. This comprises, as before, a pupil portion 30' and an iris portion 32' surrounding the pupil portion, the iris portion comprising the grooved area 36' circled by the planar rim area 38', the grooved area 36' at its juncture with the peripheral area 38 being depressed throughout its circumference below the peripheral area, and being also shown (preferably) depressed below the pupil area 30'. In this modification, the depressed grooved area is formed into straight (non-curved) radial angular serrations, each having the side faces $a'$ and $b'$ forming a dihedral angle, the apex of the angle being defined by the line $c'$, and the drop or depression of the serrations at their juncture with the rim area 38' being represented by the line $d'$. Here the successive serrations are contiguous. The star-like effect of the iris in this form of the structure is produced by the zig-zag shaping of the inner periphery of the rim area, in this case resulting in the formation of the vertical angularly related faces $e'$ and $f'$. The iris lines are defined by the angular serrations, which latter also act as the means for reflecting the tint of the eye member material and imparting this tint to the part of the iris. In FIG. 11, the grooved and rim areas of the iris are mutually distinct and symmetrically structured, the faces $a'$ and $b'$ of each serration 36' being geometrically joined to the faces $f'$ and $e'$ respectively of each angular formation in the rim area 38'.

In FIG. 12 of the drawings, I show a still further modification of the rear surface configuration of the eye member showing multiple grooves in the inner iris portion and a symmetrical star formation in the peripheral, raised iris portion. This more specifically comprises, as before, a pupil portion $30^2$ and an iris portion $32^2$ surrounding the pupil portion, the iris portion comprising the grooved area $36^2$ circled by the planar rim area $38^2$, the grooved area $36^2$ at its juncture with the peripheral area $38^2$ being depressed throughout its circumference below the peripheral area, and being also shown depressed below the pupil area 30'. Here the depressed grooved area is formed with an increased number of radial angular serrations. The angular serrations each has the side faces $a^2$ and $b^2$, forming a dihedral angle, the apex of the angle being defined by the line $c^2$. The drop or depression of the serrations at their juncture with the rim area $38^2$ is represented by the lines $d^2$. Here the successive serrations may also be contiguous as shown. The star-like effect of the iris, as before, is produced by the zig-zag shaping of the inner periphery of the rim area $38^2$, in this case resulting in the formation of the vertical angularly related faces $e^2$ and $f^2$. These parts function in the same manner as do the corresponding parts of the structure of FIG. 11.

The structure of the doll eye of the present invention, the method of making the same, the lifelike doll eye produced and the economies resulting from the eye structure and the method of making the doll eye and the other advantages set forth will in the main be fully apparent from the above detailed description. It will be further apparent that many changes may be made in both the doll eye and the method without departing from the spirit of the invention defined in the following claims.

I claim:

1. A doll eye comprising an eye member made out of a single body of transparent material and provided with a pupil portion and an iris portion, the iris portion comprising (a) a grooved area of radially arranged serrations surrounding the area of the pupil portion and (b) a generally planar continuous peripheral area surrounding the grooved area, the radially arranged serrations of the grooved area forming iris lines and the peripheral area forming the iris rim, the inner periphery of the iris rim being star shaped to impart a star-like appearance to the iris lines, and the grooved area at its juncture with the peripheral rim area being depressed throughout its circumference below the peripheral rim area.

2. The doll eye of claim 1 in which the grooved area throughout its circumference is depressed below the peripheral rim area and also below the pupil area.

3. The doll eye of claim 2 in which a coloring coat is extraneously applied to the peripheral rim area, and a separate coloring coat is extraneously applied to said pupil area.

4. A doll eye comprising an eye member made out of a single body of a tinted transparent material and provided with a pupil portion and an iris portion, the iris portion comprising (a) a grooved area of radially arranged angular serrations surrounding the area of the pupil portion and (b) a generally planar continuous peripheral area surrounding the grooved area, the radially arranged serrations of the grooved area forming iris lines, the peripheral area forming the iris rim, the inner periphery of the iris rim being star shaped to impart a star-like appearance to the iris lines, and the grooved area at its juncture with the peripheral rim area being depressed throughout its circumference below the peripheral area, extraneous coloring applied to said peripheral area, and the said grooved area being devoid of extraneous coloring, the angular serrations of the grooved area forming means for reflecting the tint of the transparent material and imparting the tint to the grooved area.

5. The doll eye of claim 4 in which the grooved area throughout its circumference is depressed below the peripheral rim area and also below the pupil area, and in which a coloring coat is extraneously applied to the pupil area.

References Cited in the file of this patent

UNITED STATES PATENTS

| 1,373,579 | Wendtland | Apr. 5, 1921 |
| 2,254,232 | Marcus | Sept. 2, 1941 |
| 2,753,660 | Brudney | July 10, 1956 |

FOREIGN PATENTS

| 493,080 | Germany | Mar. 1, 1930 |
| 1,188,870 | France | Mar. 16, 1959 |